July 27, 1937.　　　J. P. PITTMAN　　　2,088,534
LAWN EDGE TRIMMER
Filed Jan. 26, 1937　　　2 Sheets-Sheet 1
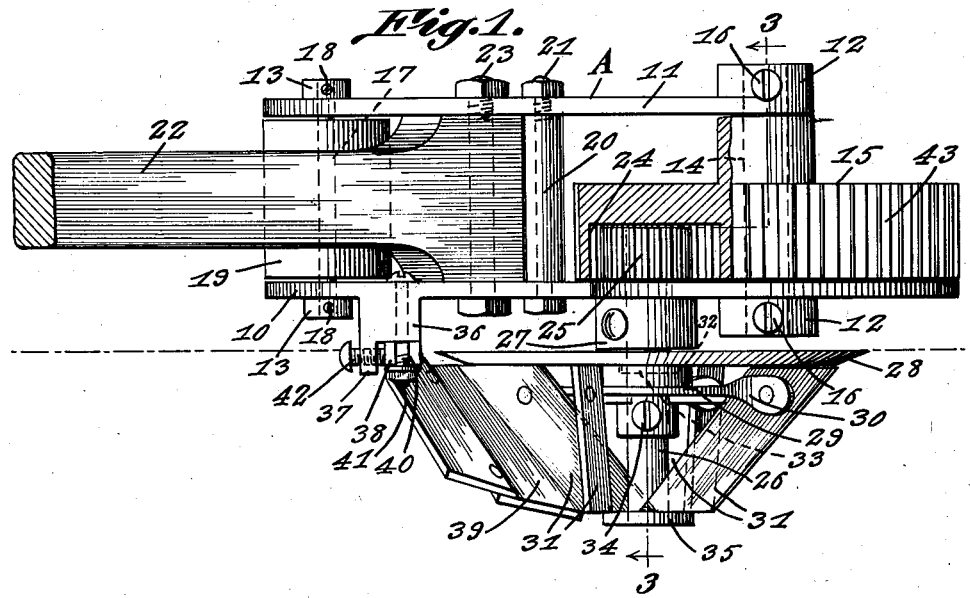
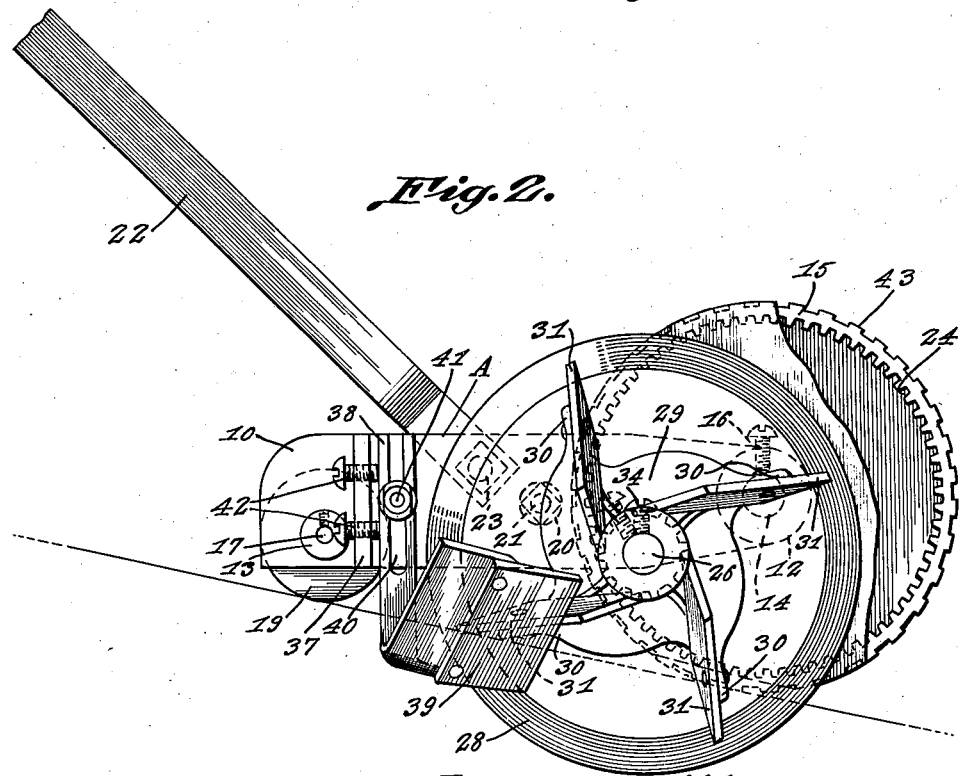
James P. Pittman, INVENTOR
BY Victor J. Evans & Co.
ATTORNEYS

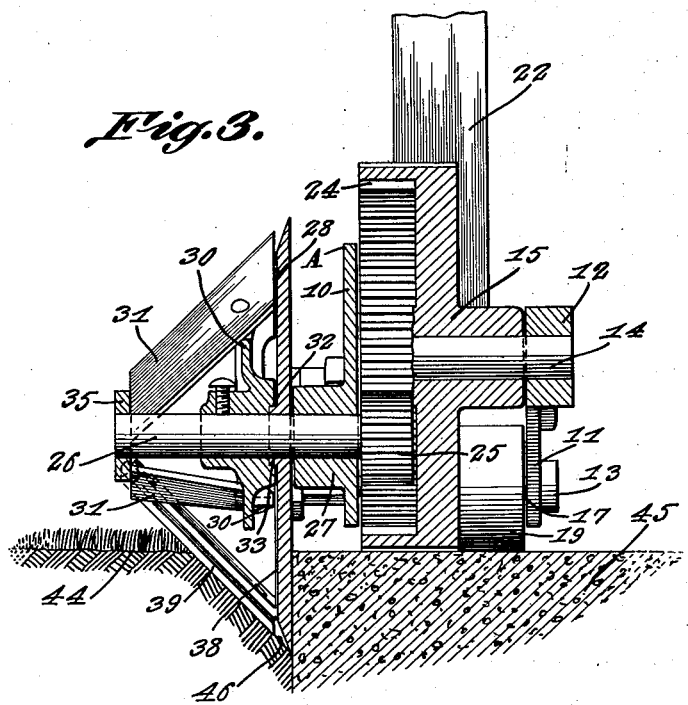
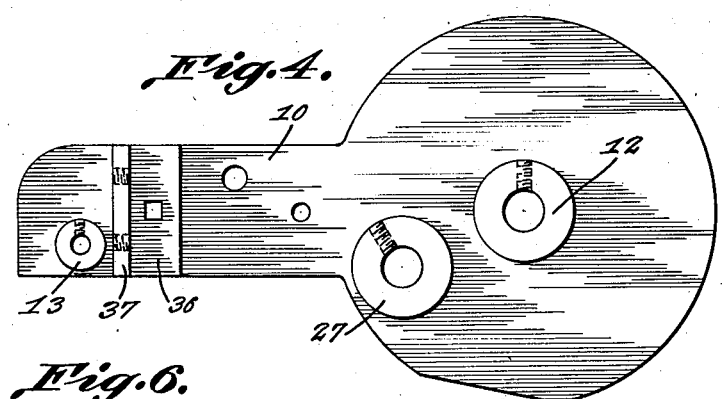
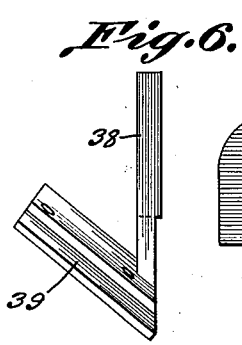
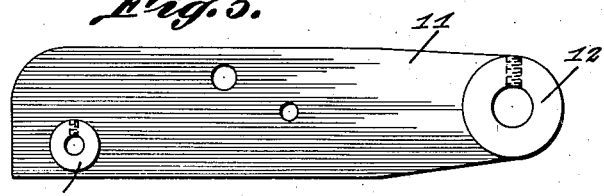

Patented July 27, 1937

2,088,534

UNITED STATES PATENT OFFICE 2,088,534

LAWN EDGE TRIMMER

James P. Pittman, Port Arthur, Tex.

Application January 26, 1937, Serial No. 122,459

2 Claims. (Cl. 97—227)

The invention relates to an edge mower and more especially to a lawn edge trimmer.

The primary object of the invention is the provision of a trimmer of this character, wherein the edges of a lawn can be cut or trimmed to assure a neat appearance thereto, a rotary cutter being designed to furrow the lawn between the trimmed edge of the latter and an adjoining edge of a side walk or the like.

Another object of the invention is the provision of a trimmer of this character, wherein a traction wheel constitutes the driver for the rotary cutter of such trimmer and cooperating with the rotary cutter is an adjustable slide cutter wherein through the action of these the lawn will be accurately trimmed and the appearance of such lawn thereby enhanced.

A further object of the invention is the provision of a trimmer of this character, wherein the construction and the assembly of the same is novel and such trimmer involves a carriage movable over the walk adjoining a lawn edge so that this lawn edge can be readily and easily trimmed with accuracy, the trimmer being hand pushed in the operation thereof.

A still further object of the invention is the provision of a trimmer of this character, which is simple in its construction, thoroughly reliable and efficient in its operation, comparatively light in weight yet strong, durable, readily and easily handled, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary top plan view of a trimmer partly in section constructed in accordance with the invention.

Figure 2 is a side elevation partly in section.

Figure 3 is a sectional view on the line 3—3 of Figure 1 looking in the direction of the arrows.

Figure 4 is an elevation of one of the side plates of the carriage.

Figure 5 is an elevation of another side plate of the carriage.

Figure 6 is a front elevation of the slide cutter of the trimmer.

Similar reference characters indicate corresponding parts throughout the several views in the drawings.

Referring to the drawings in detail, the trimmer is fashioned similar to a lawn mower and involves a carriage A including spaced parallel side plates 10 and 11, respectively, while fore and aft of these plates at the outer faces thereof are the bearing lugs 12 and 13, respectively. The lugs 12 accommodate an axle 14 for a traction wheel 15, the axle being made fast in the lugs 12 by set screws 16 and such traction wheel is freely rotatable on said axle. The lugs 13 accommodate a journal 17 which is made fast in the said lugs by set screws 18 and this journal 17 has loosely fitted thereon a rotatable trailer roller 19.

The plates 10 and 11 are held in their spaced relation to each other by a spacer sleeve 20 upon a nut carrying bolt 21 secured in the said plates and rearwardly of this sleeve 20 between the plates is pivotally supported a handle bar 22, its pivot being indicated at 23.

The traction wheel 15 at one side is formed with an annular internal gear or a ring gear 24 with which meshes a companion pinion 25 fixed to a cutter shaft 26 journaled in a bearing lug 27 on the plate 10 at the outer side thereof. This shaft 26 projects laterally to one side of the carriage A and beyond the same. Loosely engaged on the shaft 26 is a rotatable cutter disk 28 while fixed to the said shaft is a spider 29, its arms 30 carrying laterally directed outwardly convergent cutter blades 31, these being properly angled with respect to the longitudinal axis of the shaft 26. The spider 29 has a counterseat 32 for a boss 33 formed on the disk 28 so that these parts are interfitted with each other when engaged upon the shaft 26. The spider is releasably fixed to the shaft 26 by a set screw 34. The disposition of the cutter blades 31 on the spider 29 effects a substantially truncated cone shaped rotary cutter. The blades 31 at their outer ends are unioned with a terminal ring 35 about the outer end of said shaft 26.

The plate 10 rearwardly of the rotary cutter and disk 28 has formed thereon a raised bed 36 built with a rib 37 outstanding therefrom and against this bed 36 is arranged the adjustable stem 38 of a bracket for a slide cutter 39, the stem being formed with an elongated slot 40 for the adjustment thereof on a fastener 41 engaged in the plate 10 through the bed 36 thereon. The rib 37 is fitted with adjusting screws 42 which work against the stem 38 to regulate the angular disposition of said stem in the adjustment of the slide cutter. The cutter 39 is angled or inclined inwardly in conformity with the cone formation of the rotary cutter and the blade of this cutter 39 cooperates with the blades 31 of the said rotary cutter.

The cutter 39 functions to furrow a lawn adjoining a walk while the disk 28 and the rotary cone cutter trim the edging of the lawn adjoining said walk.

The traction wheel 15 is formed with an antiskid outer periphery 43 to avoid slipping of said wheel 15 which is the power wheel for the rotary cutter of the trimmer.

The slide cutter can be adjusted vertically to regulate the depth of the furrow to be cut at the edge of a lawn by the trimmer. A portion of the lawn is indicated at 44 and a portion of a walk at 45 while the furrow is indicated at 46 in Figure 3 of the drawings. The blade of the cutter 39 is stationary with respect to the blades 31 of the rotary cutter of the trimmer.

What is claimed is:

1. A lawn edge trimmer comprising a carriage including spaced parallel side plates, a traction wheel journaled fore of the carriage between said side plates and having internal gear teeth, a trailer roller journaled aft of said carriage between said side plates, a handle bar pivoted to the carriage between the side plates intermediate thereof, a driven shaft journaled in one side plate and projected laterally from one side of the carriage and having a pinion meshing with the internal gear teeth of said traction wheel, a rotatable cutter disk loosely journaled on said shaft exteriorly of the carriage and adjacent to one side plate thereof, a spider fixed to the shaft next to the outer side of the cutter disk, laterally directed outwardly convergent cutter blades fixed to the spider and angled with respect to the longitudinal axis of the said shaft to effect a truncated cone-shaped rotary cutter, and a terminal ring on the outermost end of the shaft and unioned with the said blades at the outer ends thereof.

2. A lawn edge trimmer comprising a carriage including spaced parallel side plates, a traction wheel journaled fore of the carriage between said side plates and having internal gear teeth, a trailer roller journaled aft of said carriage between said side plates, a handle bar pivoted to the carriage between the side plates intermediate thereof, a driven shaft journaled in one side plate and projected laterally from one side of the carriage and having a pinion meshing with the internal gear teeth of said traction wheel, a rotatable cutter disk loosely journaled on said shaft exteriorly of the carriage and adjacent to one side plate thereof, a spider fixed to the shaft next to the outer side of the cutter disk, laterally directed outwardly convergent cutter blades fixed to the spider and angled with respect to the longitudinal axis of the said shaft to effect a truncated cone-shaped rotary cutter, a terminal ring on the outermost end of the shaft and unioned with the said blades at the outer ends thereof, a rib formed on one of the side plates of the carriage rearmost to the said cutter and having set screws, a vertically adjustable hanger fitted with the rib and engaged by the set screws, and a slide cutter on said hanger and angled inwardly in conformity with the cone-shaped cutter for cooperation with the blades of the latter.

JAMES P. PITTMAN.